Patented Nov. 27, 1934

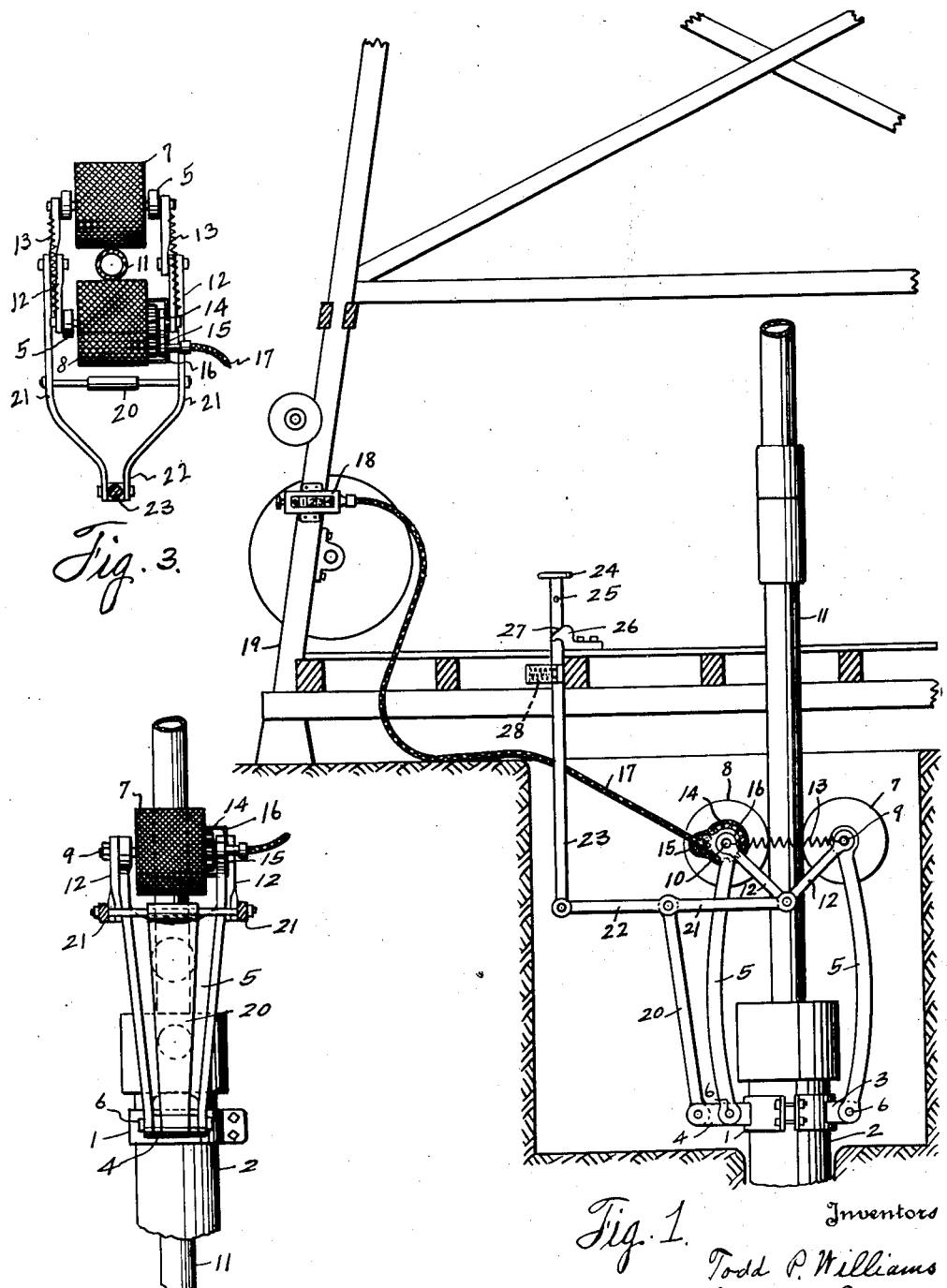

1,982,184

UNITED STATES PATENT OFFICE 1,982,184

MEASURING APPARATUS

Todd P. Williams and James A. Baxter, Mont Belvieu, Tex., assignors to Howard Smith Company, Houston, Tex., a corporation Application August 12, 1932, Serial No. 628,560

4 Claims. (Cl. 33—134)

This invention relates to a measuring apparatus.

An object of the invention is to provide measuring apparatus of the character described specially designed for use in measuring the length of a string of pipe as the same is lowered into or withdrawn from a well bore.

In carrying on well drilling operations, it is, at times, necessary to know the length of the string of pipe which is lowered into the well and at the present time it is customary to measure each section of the pipe as the same is connected into the string and lowered and to then total up the lengths of the sections in order to ascertain the total length of the string, but by this method errors often occur due to inaccuracy in measuring the sections as well as inaccuracy in addition.

The apparatus herein disclosed has been provided for automatically measuring the pipe accurately to the end that the exact length of the string moved through the measuring apparatus may be at any time readily ascertained.

Another object of the invention is to provide a measuring apparatus of the character described that may be readily rendered inactive during the actual drilling operations or at times when it not be desired to measure the pipe in the well.

With the above and other objects in view this invention has particular relation to certain novel features of construction, operation and arrangement of parts, an example of which is given in this specification and illustrated in the accompanying drawing, wherein:—

Figure 1 shows a side elevation of the apparatus shown mounted on the casing and in proper relation with the derrick and with the pipe to be measured.

Figure 2 shows an elevational view of the apparatus, partly in section, taken at right angles to the view shown in Figure 1, and Figure 3 shows a plan view partly in section.

Referring now more particularly to the drawing wherein like numerals of reference designate similar parts in each of the figures, the numeral 1 designates a clamp which is secured to the upper end of the well casing 2 beneath the derrick floor and extending out from the opposite sides of the clamp are the arms 3, 4. There are the outwardly curved levers 5, 5 whose lower ends may be bifurcated to embrace said arms to which, said bifurcated ends are pivotally connected by means of the cross pins, as 6, 6. The clamp 1 is shown as being a preferred construction for mounting the levers 5, 5 although any selected mounting for said levers may be employed.

As more clearly shown in Figure 2, the levers 5 are widened upwardly and their upper ends are also bifurcated and between these upper bifurcated ends are the rollers 7, 8 which may be fixed on the shafts 9, 10 which are rotatable in suitable bearings in the bifurcated upper ends of the levers 5, 5. The rollers 7, 8 are preferably knurled or toothed so that they will grip the pipe 11 between them and the length of which is to be measured.

There are the pairs of toggle levers 12, 12, one pair being on each side of the pipe 11. The toggle levers of each pair are pivoted together at their lower ends and at their upper ends have bearings in which the shafts 9, 10 rotate. The upper ends of the toggle levers of each pair may be connected by strong pull springs, as 13.

Fixed on one end of the shaft 10 there is a spur gear 14 which is in mesh with and drives a smaller spur gear 15 which is mounted in a suitable gear housing 16 carried by the upper end of the corresponding lever 5. The gear 15 is fixed on the adjacent end of a flexible shaft 17 and this shaft is operatively connected with and drives a conventional counter 18 which is mounted at a convenient place in the derrick 19.

The arm 4 is extended and its outer end is bifurcated as more clearly shown in Figure 2, and the lower end of a standard 20 is pivoted on said outer end of said arm 4. Pivoted to the upper end of said standard 20 there is a yoke having the side arms 21 whose free ends are pivoted to the lower ends of the respective pairs of toggle levers 12 and this yoke has the outwardly extending arms 22, to the free ends of which the lower end of the push bar 23 is pivoted. This push bar works up through a bearing in the derrick floor and its upper end has a pedal 24 thereon and beneath said pedal said push bar 23 has a laterally extending stud 25. Secured on the derrick floor adjacent the push bar 23 there is the dog 26 having a sloping upper face 27. There is a push spring 28 which operates against the bar 23 and normally holds it in cooperating relation with the dog 26.

If it be desired to render the apparatus inactive the operator may force the bar 23 downwardly until the stud 25 strikes and passes the sloping face 27 of the dog 26 and thereupon the spring 28 will cause said stud to engage underneath said dog 26. When the bar 23 is forced downwardly the arms 21 will be moved upwardly causing a corresponding movement of the lower ends of the toggle levers 12 and the upper ends of these toggle members will be moved outwardly carrying the rollers 7, 8 out of contact with the pipe 11, and said rollers will be locked in said inactive position by the engagement of the stud 25 under the dog 26. The measuring apparatus when in said inactive position will not interfere with ordinary drilling operations. If it now be desired to measure the pipe to be withdrawn from the bore or measure pipe to be let into the bore the stud 25 may be released from the dog 26 and thereupon the springs 13 will pull the rollers 7, 8 into contact with said pipe and as the pipe is moved between said rollers the gears 14, 15, will be correspondingly turned to operate the counter 18 and the length of the pipe thus moved between said rollers will be accurately registered by the counter 18.

What is now considered a preferred form of the invention has been disclosed but it is obvious that mechanical changes may be made in the construction of the apparatus without departing from the principle of the invention. The disclosure has been by way of illustration merely while the broad principle of the invention will be defined by the appended claims.

What we claim is:

1. A device for ascertaining the amount of longitudinal movement of a pipe in a casing in a well bore, comprising a supporting framework clamped to the casing and having a pivotally mounted, upstanding roller support, a roller on said support, means for holding said roller yieldingly against said pipe whereby the roller will be rotated as the pipe is moved longitudinally, a register, means connected with and adapted to be driven by said roller and also connected with and adapted to drive said register, and means for moving, and locking, said roller in inactive position out of contact with said pipe.

2. A device for ascertaining the amount of longitudinal movement of a pipe in a casing in a well bore, said device comprising a clamp adapted to be secured around said casing, oppositely arranged levers, whose lower ends are pivoted to said clamp, said levers upstanding from the clamp and being arranged approximately parallel, confronting rollers rotatably mounted on the upper ends of the respective levers and arranged to receive the pipe to be measured between them, means for holding said rollers yieldingly against said pipe whereby the rollers will be rotated as the pipe is moved vertically, a register, means connected with and adapted to be driven by one of said rollers and also connected with and adapted to drive said register, pairs of toggle levers, the levers of each pair being pivoted together at one end and whose other ends are connected to the respective ends of the corresponding rollers, pivotally mounted arms which are pivotally attached to the connected ends of the respective pairs of toggle levers and means for actuating said arms to operate the toggle levers whereby said rollers may be moved to inactive position out of contact with the pipe.

3. A device for ascertaining the amount of longitudinal movement of a pipe in a casing in a well bore, said device comprising a clamp adapted to be secured around said casing, oppositely arranged levers, whose lower ends are pivoted to said clamp, said levers upstanding from the clamp and being arranged approximately parallel, confronting rollers rotatably mounted on the upper ends of the respective levers and arranged to receive the pipe to be measured between them, means for holding said rollers yieldingly against said pipe whereby the rollers will be rotated as the pipe is moved vertically, a register, means connected with and adapted to be driven by one of said rollers and also connected with and adapted to drive said register, pairs of toggle levers, the levers of each pair being pivoted together at one end and whose other ends are connected to the respective ends of the corresponding rollers, pivotally mounted arms which are pivotally attached to the connected ends of the respective pairs of toggle levers, means for actuating said arms to operate the toggle levers whereby said rollers may be moved to inactive position out of contact with the pipe, and means for locking the rollers in said inactive position.

4. A device for ascertaining the amount of longitudinal movement of a pipe in a casing in a well bore, comprising a supporting framework, means for securing said framework to the top of the casing, a pivotally mounted upstanding support on said framework, a rotatable member on said support, means for holding said rotatable member yieldingly against the pipe whereby said member will be rotated as the pipe is moved longitudinally, a register, means connected with and adapted to be driven by said rotatable member and also connected with and adapted to drive the register and means for moving, and locking, said rotatable member in inactive position out of contact with the pipe.

TODD P. WILLIAMS.
JAMES A. BAXTER.